United States Patent
Doddaiah et al.

(10) Patent No.: US 11,645,012 B1
(45) Date of Patent: May 9, 2023

(54) METHOD AND APPARATUS FOR DISTRIBUTING READ OPERATIONS BETWEEN EMULATIONS IN A STORAGE ENGINE

(71) Applicant: Dell Products, L.P., Hopkinton, MA (US)

(72) Inventors: Ramesh Doddaiah, Westborough, MA (US); Peng Wu, Westborough, MA (US); Rong Yu, West Roxbury, MA (US); Earl Medeiros, Fall River, MA (US); Peng Yin, Southborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 12 days.

(21) Appl. No.: 17/577,489

(22) Filed: Jan. 18, 2022

(51) Int. Cl.
*G06F 3/06* (2006.01)

(52) U.S. Cl.
CPC ............ *G06F 3/0664* (2013.01); *G06F 3/067* (2013.01); *G06F 3/0613* (2013.01); *G06F 3/0659* (2013.01)

(58) Field of Classification Search
CPC .... G06F 3/0664; G06F 3/0613; G06F 3/0659; G06F 3/067
See application file for complete search history.

(56) References Cited

U.S. PATENT DOCUMENTS

| 2005/0005063 A1* | 1/2005 | Liu | G06F 3/0689 |
| | | | 711/112 |
| 2005/0120188 A1* | 6/2005 | Kuwabara | G06F 3/0605 |
| | | | 711/159 |
| 2018/0210744 A1* | 7/2018 | Shih | G06F 12/10 |

OTHER PUBLICATIONS

Qadah, Thamir, Suyash Gupta, and Mohammad Sadoghi. "Q-Store: Distributed, Multi-partition Transactions via Queue-oriented Execution and Communication." EDBT. 2020. (Year: 2020).*

* cited by examiner

*Primary Examiner* — Nicholas J Simonetti
(74) *Attorney, Agent, or Firm* — Anderson Gorecki LLP (57) ABSTRACT

A Random Read Miss (RRM) distribution process monitors execution parameters of first, second, and third emulations of a storage engine, and distributes newly received read operations between the emulations. The RRM distribution process assigns newly received read operations to the first emulation, unless the CPU thread usage of the first emulation or the response time of the first emulation meet a first set of criteria. The RRM distribution process secondarily assigns newly received read operations to the second emulation, unless the CPU thread usage of the second emulation or the response time of the second emulation meet a second set of criteria. The RRM distribution process assigns all other newly received newly received read operations, that are not assigned to the first emulation or to the second emulation, to the third emulation. Distribution of read IOs between the emulations enables the storage engine to increase IOPs while minimizing response time.

20 Claims, 10 Drawing Sheets

METHOD AND APPARATUS FOR DISTRIBUTING READ OPERATIONS BETWEEN EMULATIONS IN A STORAGE ENGINE

FIELD

This disclosure relates to computing systems and related devices and methods, and, more particularly, to a method and apparatus for distributing read operations between emulations in a storage engine.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A Random Read Miss (RRM) distribution process monitors execution parameters of first, second, and third emulations of a storage engine, and distributes newly received read IO operations between the emulations. The RRM distribution process assigns newly received read operations to the first emulation, unless the CPU thread usage of the first emulation or the response time of the first emulation meet a first set of criteria. The RRM distribution process secondarily assigns newly received read operations to the second emulation, unless the CPU thread usage of the second emulation or the response time of the second emulation meet a second set of criteria. The RRM distribution process assigns all other newly received newly received read operations, that are not assigned to the first emulation or to the second emulation, to the third emulation. Distribution of read IOs between the emulations enables the storage engine to increase IOPs while minimizing response time.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
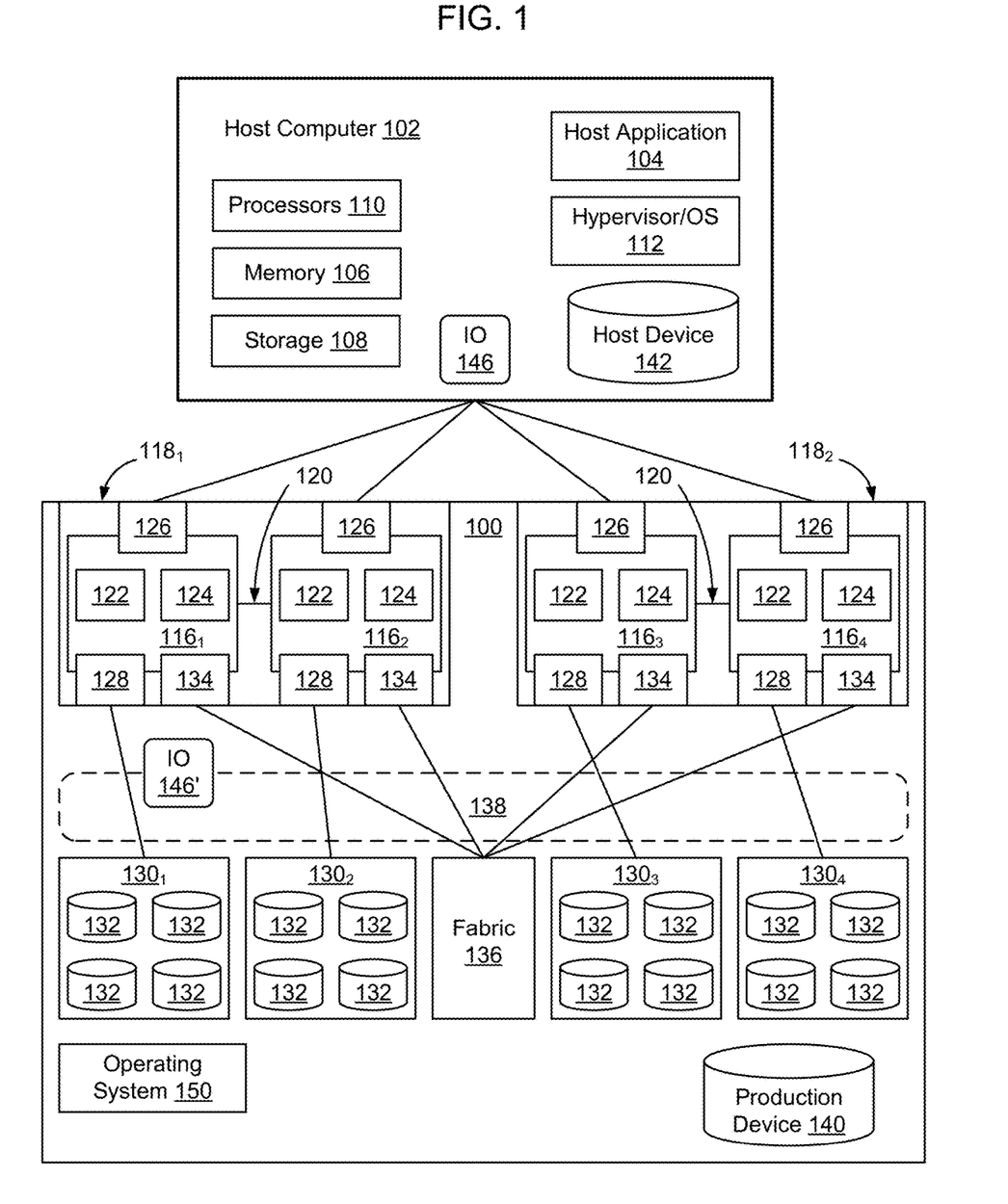
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

When a host sends a read IO operation to the storage system, the read IO operation is received at the front-end adapter 126 and processed by a front-end adapter 126 configured to process read operations. Conventionally, if the requested data was not in global memory, the front-end adapter 126 would send the read IO operation to a data service layer configured to orchestrate reading the data into global memory. The data service layer would resolve the address of the read IO where the data was stored in back-end storage resources and send the read IO to a back-end adapter 128 to read the requested data from managed drives 132 into global memory. Once the back-end adapter 128 had read the requested data into global memory, the data services layer would notify the front-end adapter 126 to enable the front-end adapter 126 to read the requested data out to the host. Sending a read miss request message and receiving a read miss completion message across different layers within the storage engine 118 adds latency to the read IO operations. Further, having the back-end adapter 128 responsible for reading 100% of data from managed drives 132 into global memory 138 can create a bottleneck to the maximum number of IO operations per second (IOPs) that can be serviced by a given storage engine 118.

Figure 2:
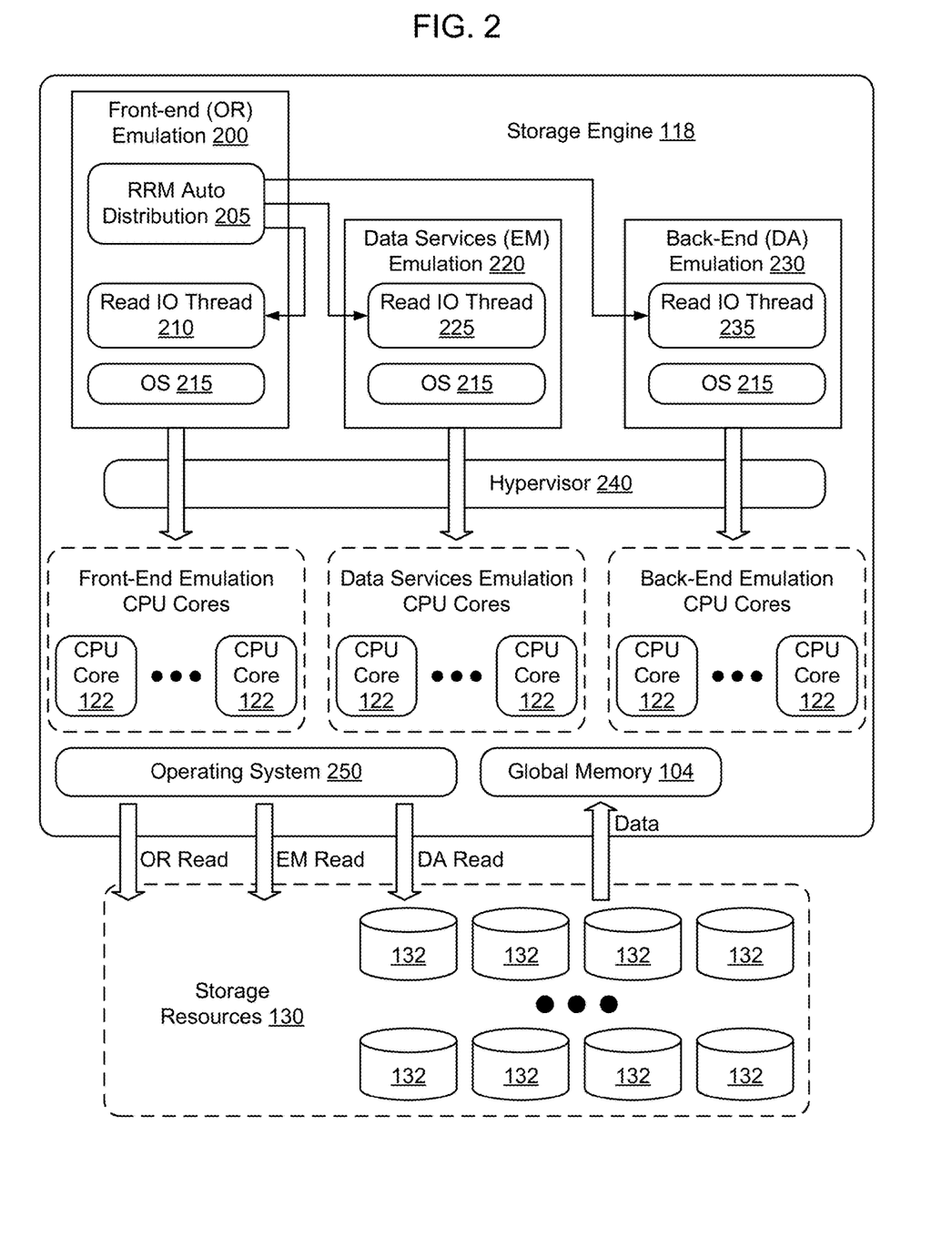
FIG. 2 is a functional block diagram of an example storage engine for use in the storage system of FIG. 1, according to some embodiments.

To alleviate this, as shown in FIG. 2, in some embodiments a storage engine 118 has a front-end emulation 200, a data services emulation 220, and a back-end emulation 230. It should be understood that, in embodiments where the storage engine 118 has a pair of compute nodes 116, each compute node 116 may separately implement a front-end emulation 200, a data services emulation 220, and a back-end emulation 230. To keep the description concise, only one set of emulations 200, 220, 230 in a given storage engine 118 will be described. It should be understood that the description provided herein applies equally where multiple sets of emulations 200, 220, 230, and associated RRM distribution processes 205 are executing within a compute node of a given storage engine 118.

Each emulation 200, 220, 230, implements a respective read IO thread 210, 225, 235, that enables each emulation 200, 220, 230, to directly read data from managed storage resources 130 into global memory 138. A Random Read Miss (RRM) distribution process 205 is implemented, for example in the front-end emulation 200, that distributes read IO operations between the emulations 200, 220, 230. Since each emulation 200, 220, 230, has a read IO thread 210, 225, 235 that is able to read data directly into global memory 138 to process read IO operations, the overall number of IO operations per second achievable by the storage engine 118 is increased, while simultaneously enabling the overall response time of the storage engine 118 to be minimized.

In some embodiments, if the front-end emulation 200 is selected to service the read IO operation, the front-end emulation 200 sends a read request to storage resources 130 over fabric 136, which causes the requested data to be stored in global memory 138. The front-end emulation 200 then reads the data from global memory 138 and responds to the host 102.

If the data services emulation 220 or back-end emulation 230 is selected to service the read IO operation, the read IO operation is sent from the front-end emulation 200 to the selected other emulation (either data services emulation 220 or back-end emulation 230) which reads the requested data from back-end storage resources 130 into global memory 138. The selected other emulation (either data services emulation 220 or back-end emulation 230) then notifies the front-end emulation 200 that the requested data has been written to global memory. The front-end emulation 200 then reads the data out from global memory 138 to the host 102 to complete the read IO operation on the storage system 100.

As shown in FIG. 2, in some embodiments the storage engine 118 has a hypervisor 240 that abstracts physical resources of the storage engine 118 and allocates sets of physical resources for use by the emulations 200, 220, 230. One of the physical resources that is allocated by the hypervisor for use by the emulations 200, 220, 230, is CPU cores 122. Specifically, as shown in FIG. 2, a first set of CPU cores is allocated for use by the front-end emulation 200, a second set of CPU cores is allocated for use by the data services emulation 220, and a third set of CPU cores is allocated for use by the back-end emulation 230.

According to some embodiments, the front-end emulation 200 includes a Random Read Miss (RRM) Distribution process 205 that allocates random read miss read IO operations between the front-end emulation 200, data services emulation 220, and back-end emulation 230. Applicant found that for a mixed workload, assigning 100% of the read IO operations to the front-end emulation 200 might provide a lower response time in some instances, but will not enable the storage engine 118 to reach a maximum IOPs, as the front-end emulation 200 will be CPU bound and run out of CPU cycles. A similar result is attained if 100% of the read IO operations are assigned to either the data services emulation 220 or the back-end emulation 230. Applicant also determined that randomly distributing read IO operations across the front-end emulation 200, data services emulation 220, and back-end emulation 230, or distributing the read IO operations using another process such as a round-robin process, caused the overall response time of the storage engine 118 to increase. Specifically, when read IO operations are sent to either the data services emulation 220 or to the back-end emulation 230, the front-end emulation 200 must send a message to the data services emulation 220 or to the back-end emulation 230, and wait for a response, which increases the latency of processing the read IO operation.

According to some embodiments, the RRM distribution process 205 uses non-linear regression to dynamically decide what percentage of incoming read IO operations need to be distributed across the front-end emulation 200, data services emulation 220, and back-end emulation 230. Experimental results, shown in FIGS. 6-10 confirm that the use of a RRM distribution process 205 provides optimal response time and optimal IOPs across pure and mixed workloads.

In some embodiments, the RRM distribution process 205 uses a multivariate sampling-based method to distribute RRM IOs across emulations 200, 220, 230, by analyzing two different dimensions of samples. The first dimension is the response time. This dimension measures the read miss response time across all emulations 200, 220, 230. The second dimension is the CPU cycle utilization across multiple emulations 200, 220, 230, by sampling respective read IO thread 200, 220, 230, CPU cycle utilization. These two dimensions give a holistic understanding of the dynamic workload resource requirements across the emulations 200, 220, 230. For peak small blocks workloads, the emulations 200, 220, 230, will be CPU bound first. For peak large blocks workloads, the emulations 200, 220, 230, will be fabric bandwidth bound first which will affect the response time. By sampling CPU utilization across read IO threads to analyze CPU bound cases, and by sampling response times across different read miss paths to understand bandwidth utilization, the RRM distribution process 205 is able to efficiently distribute the read miss requests to the front-end emulation 200, data services emulation 220, or back-end emulation 230, to get both the best response time and maximum IOPs from the storage engine 118.

Figure 3:
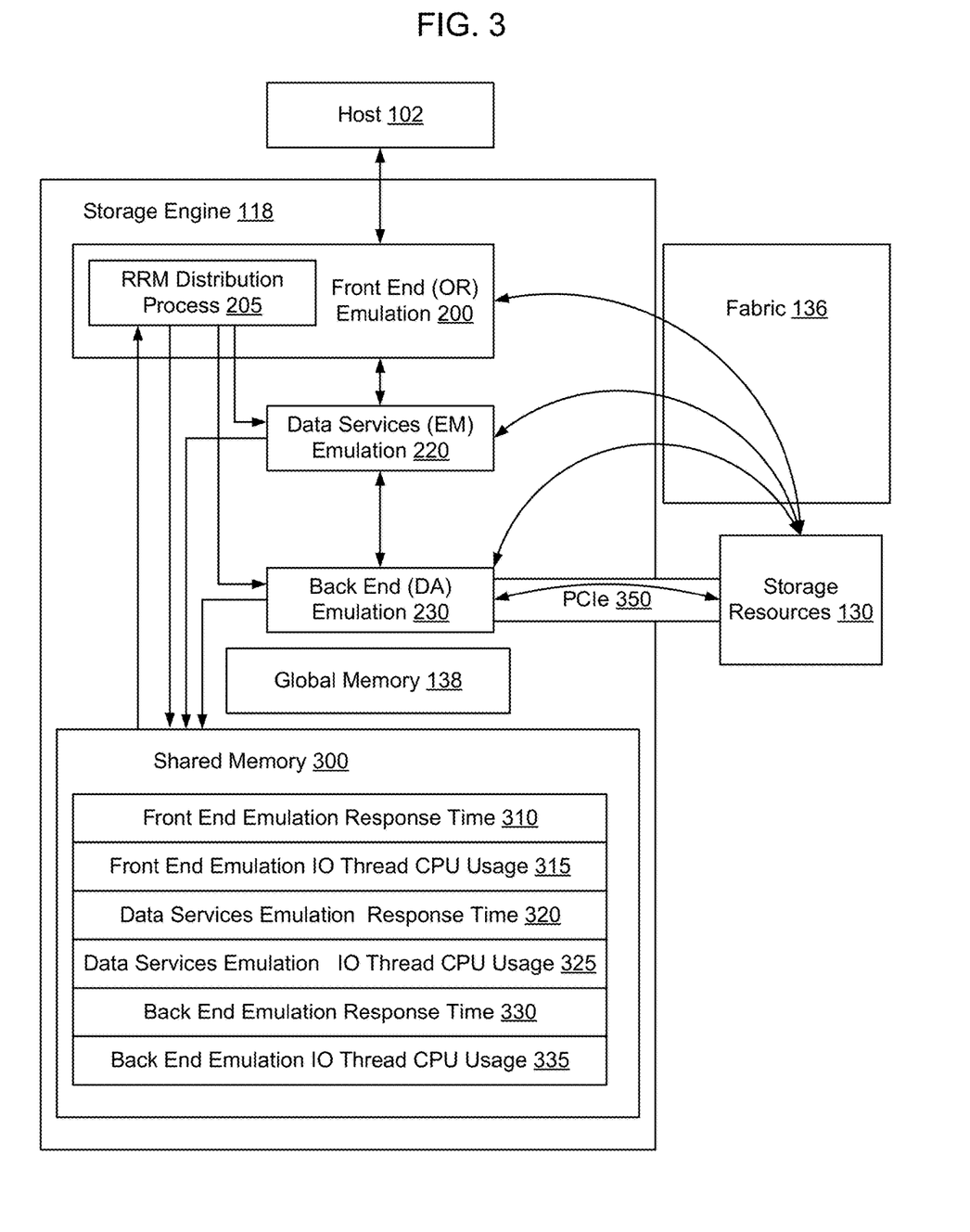
FIG. 3 is a functional block diagram showing an example process of distributing read IO operations between a front-end emulation, data services emulation, and back-end emulation in the example storage engine of FIG. 2, according to some embodiments.

FIG. 3 is a functional block diagram of an example storage engine 118, showing the front-end emulation 200, data services emulation 220, and back-end emulation 230. As shown in FIG. 3, when a read IO operation is received by the storage engine 118, the read IO operation is passed to the front-end emulation 200. If the read IO operation requests data that is in global memory 138, the front-end emulation 200 reads the data from global memory 138 and responds to the host 102. If the data requested in the read IO operation is not in global memory 138, the RRM distribution process 205 determines which emulation 200, 220, 230, should service the read IO operation.

If the front-end emulation 200 is selected to service the read IO operation, the front-end emulation 200 sends a read request to storage resources 130 over fabric 136, which causes the requested data to be stored in global memory 138. The front-end emulation 200 then reads the data from global memory 138 and responds to the host 102.

If the front-end emulation 200 is not selected to service the read IO operation, the RRM distribution process 205 instructs either the data services emulation 220 or the back-end emulation 230 to service the read IO operation. As shown in FIG. 3, in some embodiments the back-end emulation 230 is able to service read IO operations by passing read requests to storage resources 130 directly over a PCIe bus 350, rather than over fabric 136. Accordingly, in instances where the fabric 136 is saturated, as indicated by an increasing response time 310 of the front-end emulation 200, the RRM distribution process 205 preferentially selects the back-end emulation 230 to service the read IO operation. If the back-end emulation CPU utilization is high, the RRM distribution process 205 preferentially selects the data services emulation 220 to service the read IO operation. If either the data services emulation 220 or the back-end emulation 230 are selected to service the read IO operation, the data services emulation 220 or the back-end emulation 230 will cause the data requested in the read IO operation to be written to global memory 138, and once that has completed the front-end emulation 200 is notified that the requested data is available. The front-end emulation 200 then reads the data from global memory 138 and responds to the host 102.

Accordingly, since sending a read IO operation to either the back-end emulation 220 or the data services emulation 230 requires messaging between two emulations, servicing a read IO operation using either the back-end emulation 230 or data services emulation 220 may require additional time, which increases the response time of the storage engine 118. However, in particular instances, distributing some of the read IO operations to the other emulations (either the data services emulation 220 or back-end emulation 230) enables the CPU cycles of those emulations to be used in connection with servicing read IO operations, which enables the overall response time of the storage engine 118 to be minimized and simultaneously enables the storage engine 118 to service a larger number of IOPs.

As shown in FIGS. 3, in some embodiments the storage engine 118 has a shared memory 300 that is accessible to each of the front-end emulation 200, the data services emulation 220, and the back-end emulation 230. As shown in FIG. 3, each emulation 200, 220, 230, calculates an exponential moving average of response times of servicing read IO operations 310, 320, 330, and each emulation 200, 220, 230, writes the respective emulation response time 310, 320, 330, to shared memory 300. Each emulation 200, 220, 230, also samples the amount or percentage of allocated CPU cycles that are being used by the respective read IO thread in the emulation 315, 325, 335, and each emulation 200, 220, 230, writes its read IO thread CPU utilization 315, 325, 335, to shared memory 300. The RRM distribution process 205 uses these values to determine which emulation 200, 220, 230, should be used to handle a given read IO.

Figure 4:
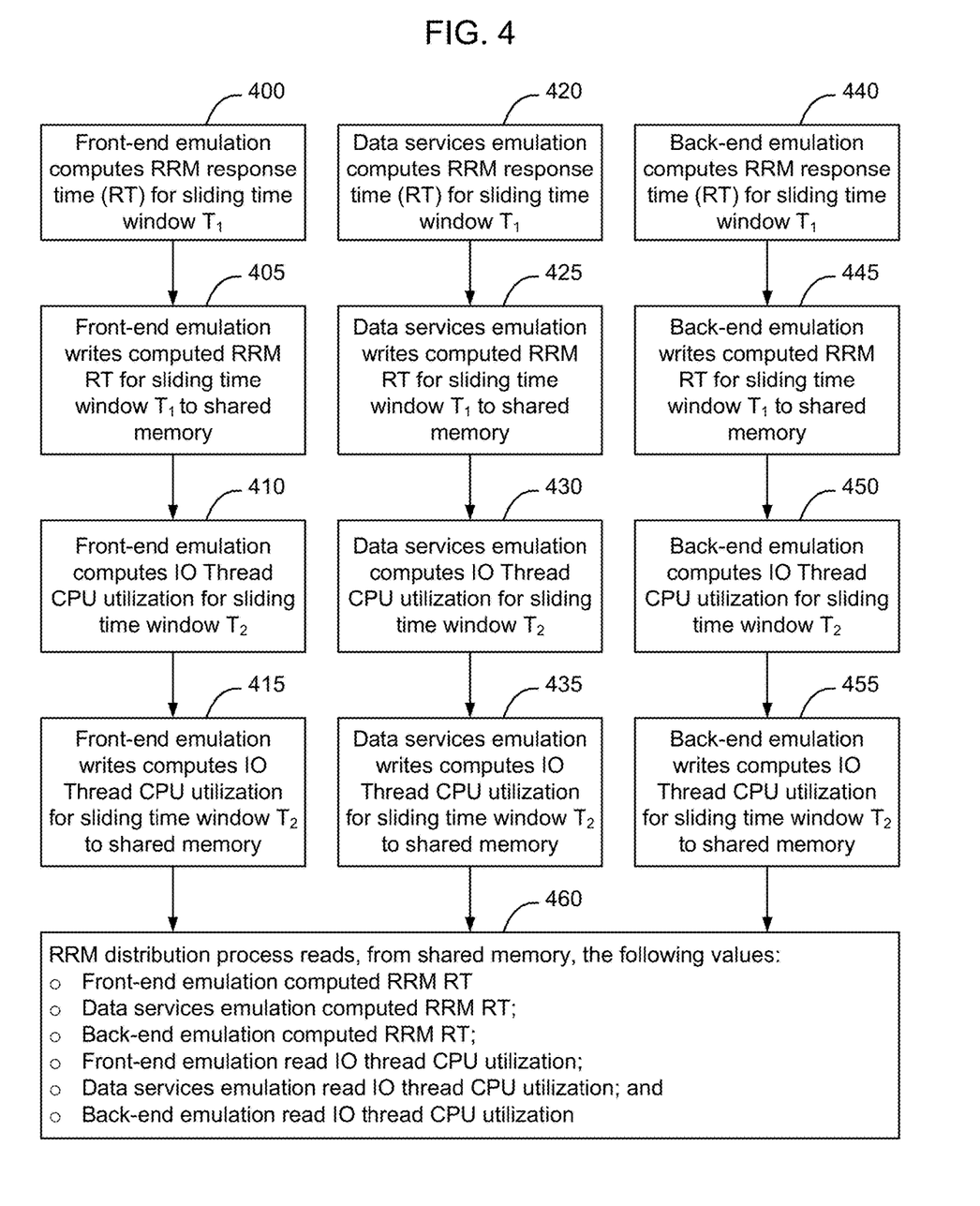
FIG. 4 is a flow chart of a process used by a Random Read Miss (RRM) distribution process to monitor performance of a front-end emulation, a data services emulation, and a back-end emulation, according to some embodiments.

FIG. 4 is a flow chart of a process used by the RRM distribution process 205 to monitor performance of the front-end emulation 200, data services emulation 220, and back-end emulation 230, according to some embodiments. As shown in FIG. 4, in some embodiments the front-end emulation 200 calculates an exponential moving average of its response times over a sliding time window with length $T_1$ (block 400) and writes the front-end emulation response time 310 to shared memory 300 (block 405). Similarly, the data services emulation 220 calculates an exponential moving average of its response times over a sliding time window with length $T_1$ (block 420) and writes the data services emulation response time 320 to shared memory 300 (block 425). The back-end emulation 230 calculates an exponential moving average of its response times over a sliding time window with length $T_1$ (block 440) and writes the back-end emulation response time 330 to shared memory 300 (block 445).

In some embodiments, the length of the sliding time window $T_1$ is the same for each emulation 200, 220, 230. In some embodiments, the length of the sliding time window may be different for each emulation 200, 220, 230. An example length of a sliding time window $T_1$ may be on the order of 5-10 minutes, although the particular length of the sliding time window $T_1$ may vary depending on the implementation.

Each emulation 200, 220, 230, also samples the amount or percentage of allocated CPU cycles that are being used by the respective read IO thread in the emulation, and writes the read IO thread CPU utilization to shared memory 300. Accordingly, as shown in FIG. 4, the front-end emulation 200 calculates an exponential moving average of an amount of CPU cycles that are being consumed by the front-end emulation read IO thread 210 over a sliding time window with length $T_2$ (block 410), and writes the front-end emulation read IO thread CPU utilization 315 to shared memory 300 (block 415). Similarly the data services emulation 220 calculates an exponential moving average of an amount of CPU cycles that are being consumed by the data services emulation read IO thread 225 over a sliding time window with length $T_2$ (block 430), and writes the data services read IO thread CPU utilization 325 to shared memory 300 (block 435). The back-end emulation 230 calculates an exponential moving average of an amount of CPU cycles that are being consumed by the back-end emulation read IO thread 235 over a sliding time window with length $T_2$ (block 450), and writes the back-end read IO thread CPU utilization 335 to shared memory 300 (block 455).

In some embodiments, the length of the sliding time window $T_2$ is the same as the length of the sliding time window $T_1$. In some embodiments, the length of the sliding time window $T_2$ is different than the length of the sliding time window $T_1$. In some embodiments, the length of the sliding time window $T_2$ is the same for each emulation 200, 220, 230. In some embodiments, the length of the sliding time window $T_2$ may be different for each emulation 200, 220, 230. An example length of a sliding time window $T_2$ may be on the order of 5-10 minutes, although the particular length of the sliding time window $T_2$ may vary depending on the implementation.

Although FIG. 4 shows the calculation of response time and CPU utilization as sequential, it should be understood that the calculation of response time and CPU utilization may be implemented in any particular order, or simultaneously, depending on the implementation. It should also be understood that the process shown in FIG. 4 iterates to enable the respective times and CPU usage values to be continuously or periodically updated in shared memory 300.

Periodically, the RRM distribution process 205 reads the shared memory to retrieve the front-end emulation response time 310, data services emulation response time 320, back-end emulation response time 330, front-end emulation CPU utilization 315, data services emulation CPU utilization 325, and back-end emulation CPU utilization 335. The RRM distribution process 205 may read the values from shared memory 300 (block 460) periodically, or in connection with processing read operations, or only in instances where the front-end emulation 200 is not selected to process the read operation, depending on the implementation. The RRM distribution process 205 then uses these values using the process shown in FIG. 5 to selectively distribute read IO operations to be serviced by the front-end emulation 200, data services emulation 220, or back-end emulation 230, to optimize response time of the storage engine 118 and to optimize the number of IOPs that are able to be processed by the storage engine 118.

Figure 5:
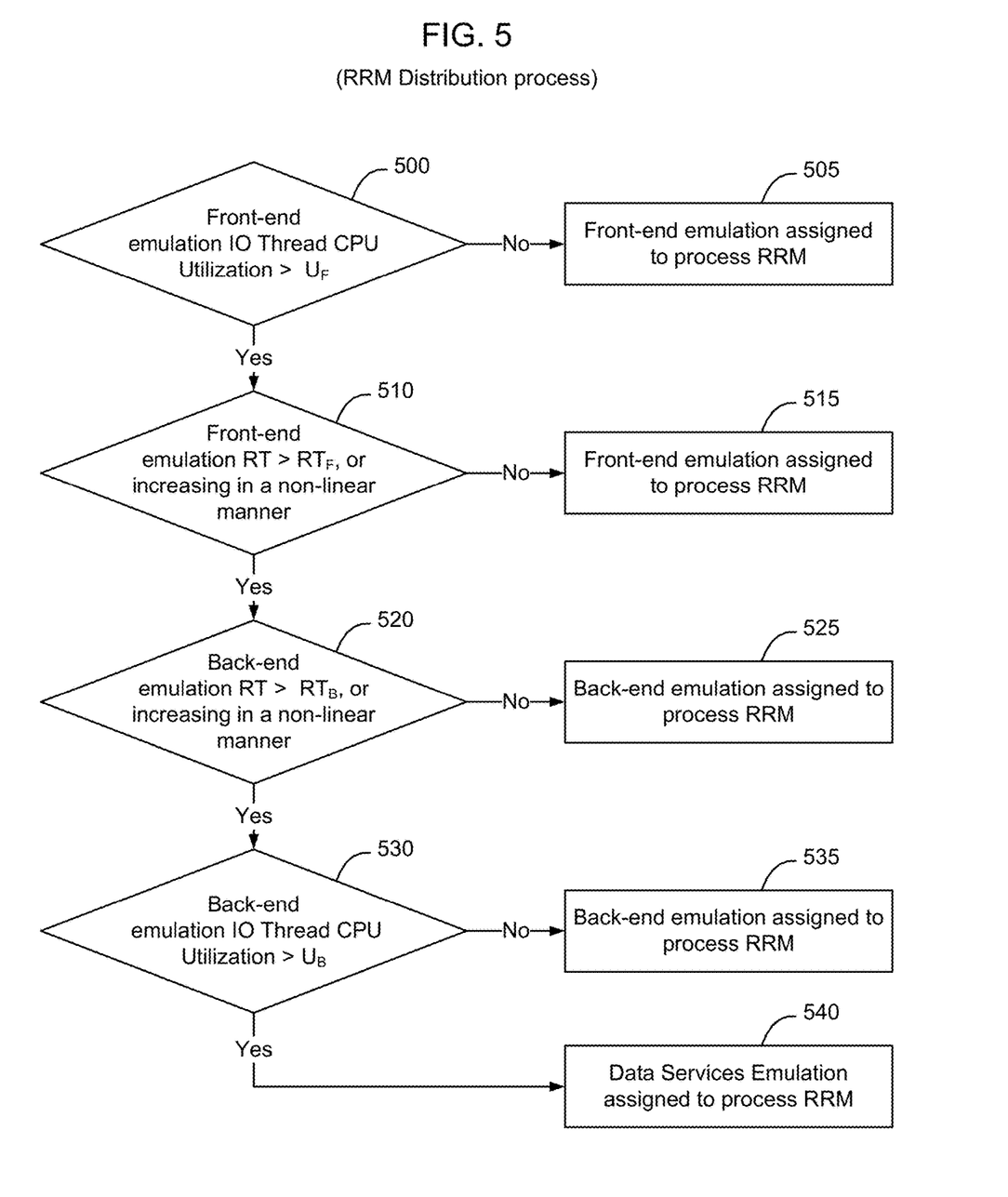
FIG. 5 is flow chart of a process used by the RRM IO distribution process to selectively distribute read IO operations to be serviced by the front-end emulation, data services emulation, or back-end emulation, according to some embodiments.

As shown in FIG. 5, when a read IO operation is received, the RRM distribution process 205 determines if the front-end thread IO utilization 315 is greater than a first threshold $U_F$ (block 500). In some embodiments, the first threshold $U_F$ is the maximum number of CPU cycles allocated to the front-end read IO thread 210, or a percentage of the maximum number of CPU cycles allocated to the front-end read IO thread 210. If the front-end read IO thread utilization 315 not greater than the first threshold $U_F$ (a determination of NO at block 500) the RRM distribution process 205 selects the front-end emulation 200 to service the read IO operation (block 505).

If the front-end thread IO utilization 315 is greater than the first threshold $U_F$ (a determination of YES at block 500) the RRM distribution process 205 determines whether the front-end emulation response time 310 is greater than a second threshold $RT_F$, or whether the front-end emulation response time 310 is increasing in a non-linear manner (block 510).

Figure 6:
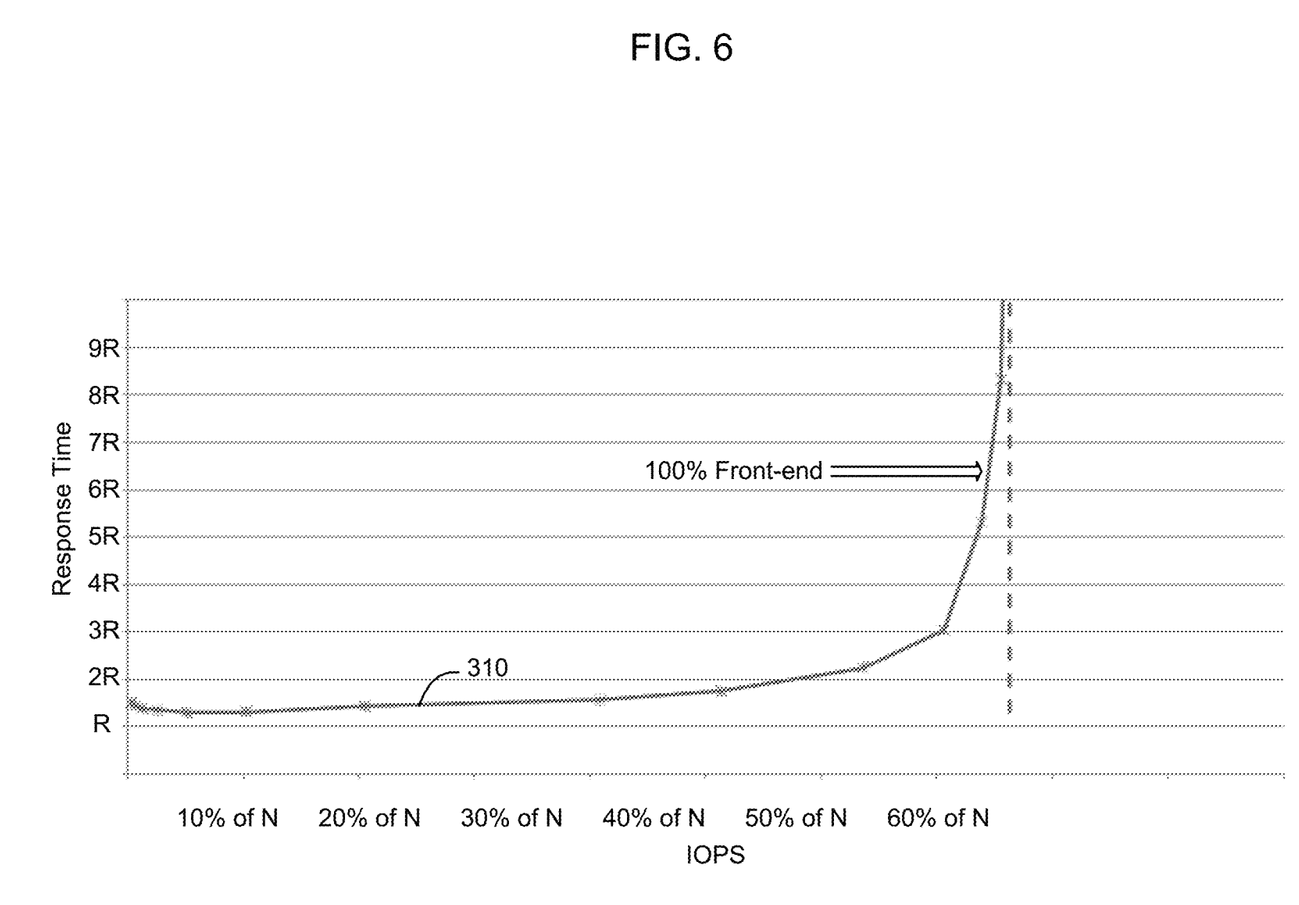
FIG. 6 is a graph of an example storage engine response time R vs Input Output Operations Sper Second (IOPs) N, where 100% of all read IO operations were serviced by the front-end emulation.

FIG. 6 is a graph of the front-end emulation response time R 310 vs % of N IOPs, where 100% of all read IO operations were serviced by the front-end emulation 200. As shown in FIG. 6, the front-end emulation 200 has relatively flat to somewhat linearly increasing response time R 310 from 0% of N IOPs to around 60% of N IOPS. After about 60% of N IOPs, the response time R 310 of the front-end emulation 200 starts to increase in a non-linear manner, with the maximum number of IOPs that are able to be processed by the front-end emulation 200 being around 65% of N IOPs. By checking to determine if the front-end emulation response time 310 is increasing in a non-linear manner, the RRM distribution process 205 is able to preferentially allocate the read operations to one of the other emulations in situations where it is possible that having the front-end emulation 200 might result in excess latency.

Accordingly, as shown in FIG. 5, if the front-end emulation 200 response time 310 is not greater than the second threshold $RT_F$ and is not increasing in a non-linear manner (a determination of NO at block 510) the RRM distribution process 205 selects the front-end emulation 200 to service the read IO operation (block 515).

If the front-end emulation response time 310 is greater than the second threshold $RT_F$, or the front-end emulation response time 310 is increasing in a non-linear manner (either condition generating a determination of YES at block 510), the RRM distribution process 205 will select either the back-end emulation 230 or the data services emulation 220 to service the read IO operation.

In some embodiments, because the back-end emulation 230 is able to access storage resources 130 using a PCI bus 350, preferentially selecting the back-end emulation 230 may enable the storage engine 118 to provide faster response time in cases where the fabric 136 is saturated. Accordingly, as shown in FIG. 5, if the front-end emulation response time 310 is greater than the second threshold $RT_F$, or the front-end emulation response time 310 is increasing in a non-linear manner (either condition generating a determination of YES at block 510), the RRM distribution process 205 determines whether the back-end emulation response time 330 is greater than a threshold $RT_B$ or is increasing in a non-linear manner.

Figure 8:
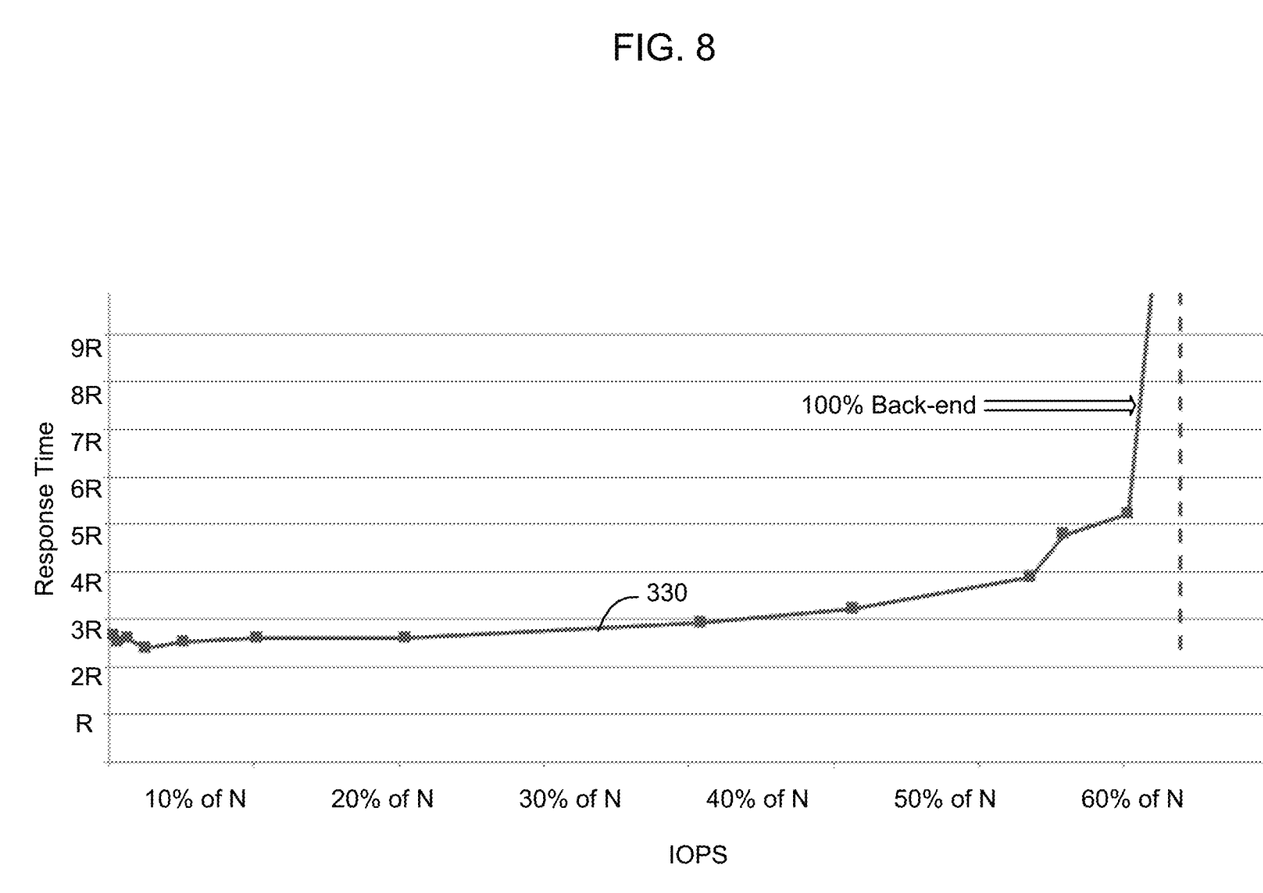
FIG. 8 is a graph of an example storage engine response time R vs Input IOPs N, where 100% of all read IO operations were serviced by the back-end emulation.

FIG. 8 is a graph of the back-end emulation response time R 330 vs % of N IOPs, where 100% of all read IO operations were serviced by the back-end emulation 230. As shown in FIG. 8, the back-end emulation 230 has relatively flat to somewhat linearly increasing response time from 0% of N IOPs to around 60% of N IOPS. After about 60% of N IOPs, the response time 330 of the back-end emulation 230 starts to increase in a non-linear manner, with the maximum number of IOPs that are able to be processed by the back-end emulation 230 being around 65% of N IOPs. By checking to determine if the back-end emulation response time 330 is increasing in a non-linear manner, the RRM distribution process 205 is able to not select the back-end emulation 230 in these conditions, to avoid situations where the back-end emulation 230 will not be able to process the read IO operation with a satisfactory response time, and to preferentially distribute the read IO operation to one of the other emulations.

Accordingly, as shown in FIG. 5, if the back-end emulation response time 330 is not greater than the third threshold $RT_B$ and is not increasing in a non-linear manner (a determination of NO at block 520) the RRM distribution process 205 selects the back-end emulation 230 to service the read IO operation (block 515).

If the back-end emulation response time 330 is greater than the third threshold $RT_B$, or the back-end emulation response time 330 is increasing in a non-linear manner (either condition generating a determination of YES at block 520), the RRM distribution process 205 determines whether the back-end IO CPU utilization 335 is greater than a fourth threshold $U_B$ (block 530). In some embodiments, the fourth threshold $U_B$ is the maximum number of CPU cycles allocated to the back-end read IO thread 235 or a percentage of the maximum number of CPU cycles allocated to the back-end read IO thread 235. If the back-end read IO thread utilization 335 not greater than the fourth threshold $U_B$ (a determination of NO at block 530) the RRM distribution process 205 selects the back-end emulation 230 to service the read IO operation (block 535). Otherwise, if the back-end read IO thread utilization 335 greater than the fourth threshold $U_B$ (a determination of YES at block 530) the RRM distribution process 205 selects the data services emulation 220 to service the read IO operation (block 540).

Figure 7:
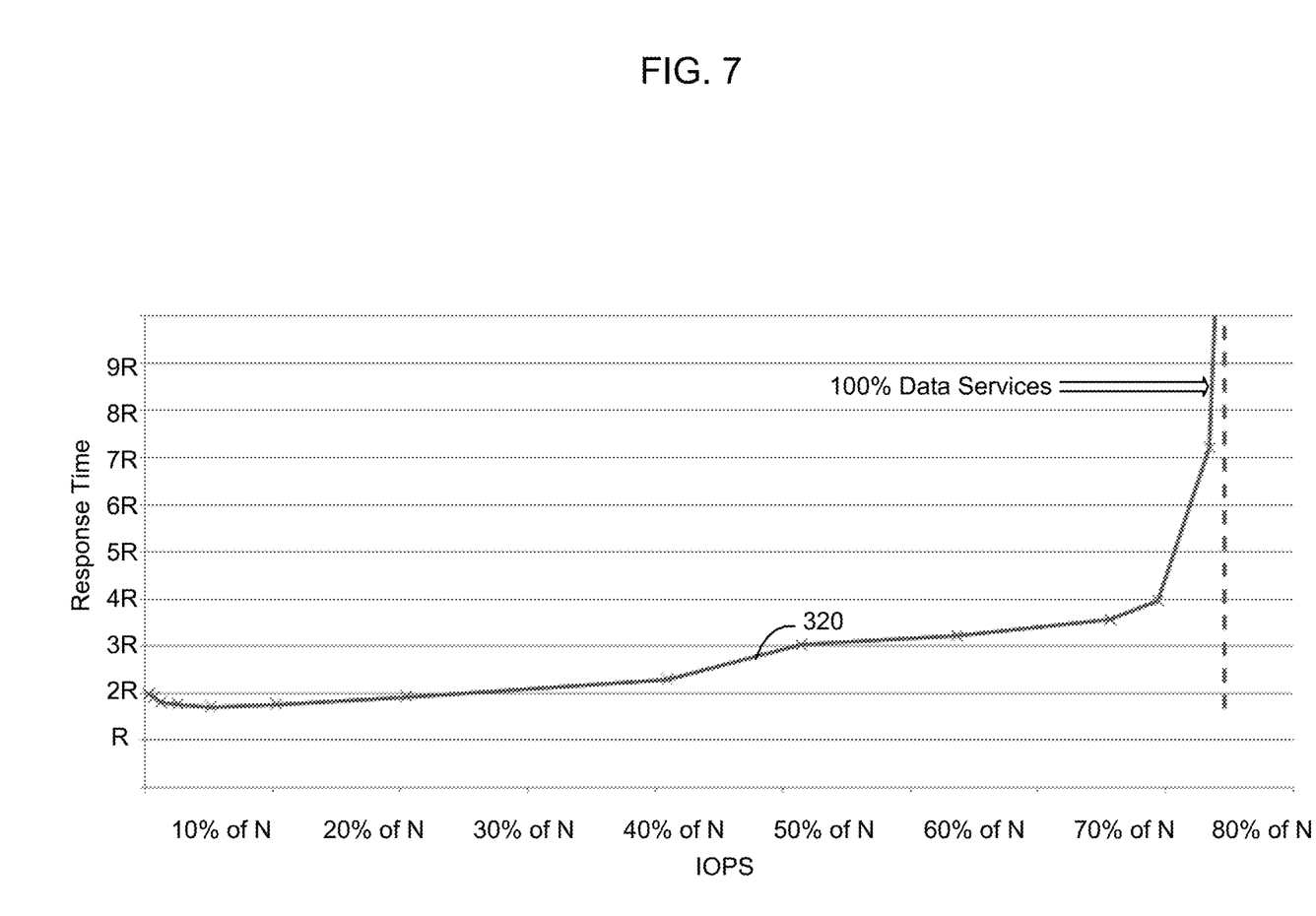
FIG. 7 is a graph of an example storage engine response time R vs IOPs N, where 100% of all read IO operations were serviced by the data services emulation.

FIG. 7 is a graph of the data services emulation response time R 320 vs % of N IOPs, where 100% of all read IO operations were serviced by the data services emulation 220. As shown in FIG. 7, the data services emulation 220 has relatively flat to somewhat linearly increasing response time 320 from 0 IOPs to around 70% of N IOPS. After about 70% of N IOPs, the response time 320 of the data services emulation 220 starts to increase in a non-linear manner, with the maximum number of IOPs that are able to be processed by the data services emulation 220 being around 75%-80% of N IOPs.

Figure 9:
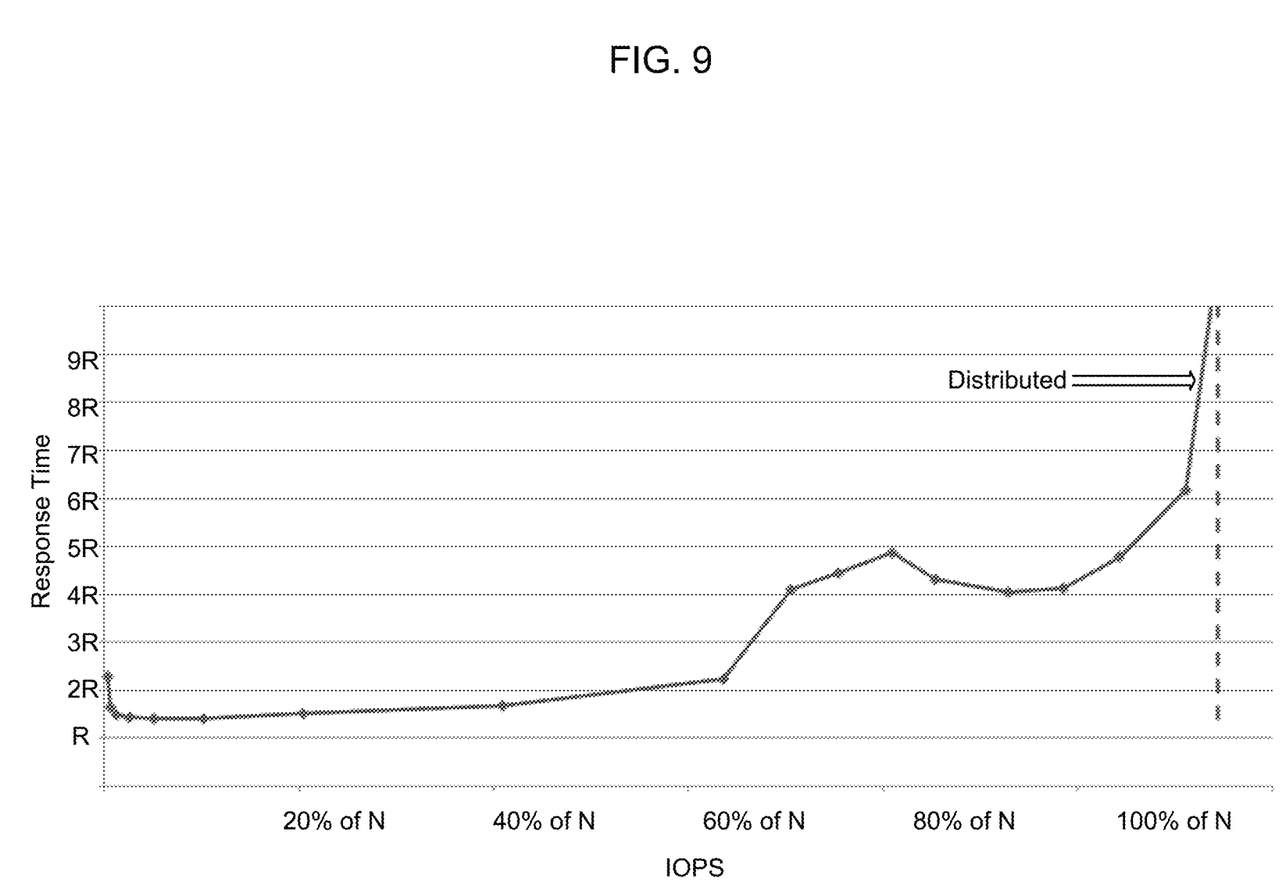
FIG. 9 is a graph of the storage engine response time R vs IOPs N achieved by the RRM distribution process 205, by distributing read IO operations to the front-end emulation, back-end emulation, and data services emulation, using the process shown in FIG. 5, according to some embodiments.
Figure 10:
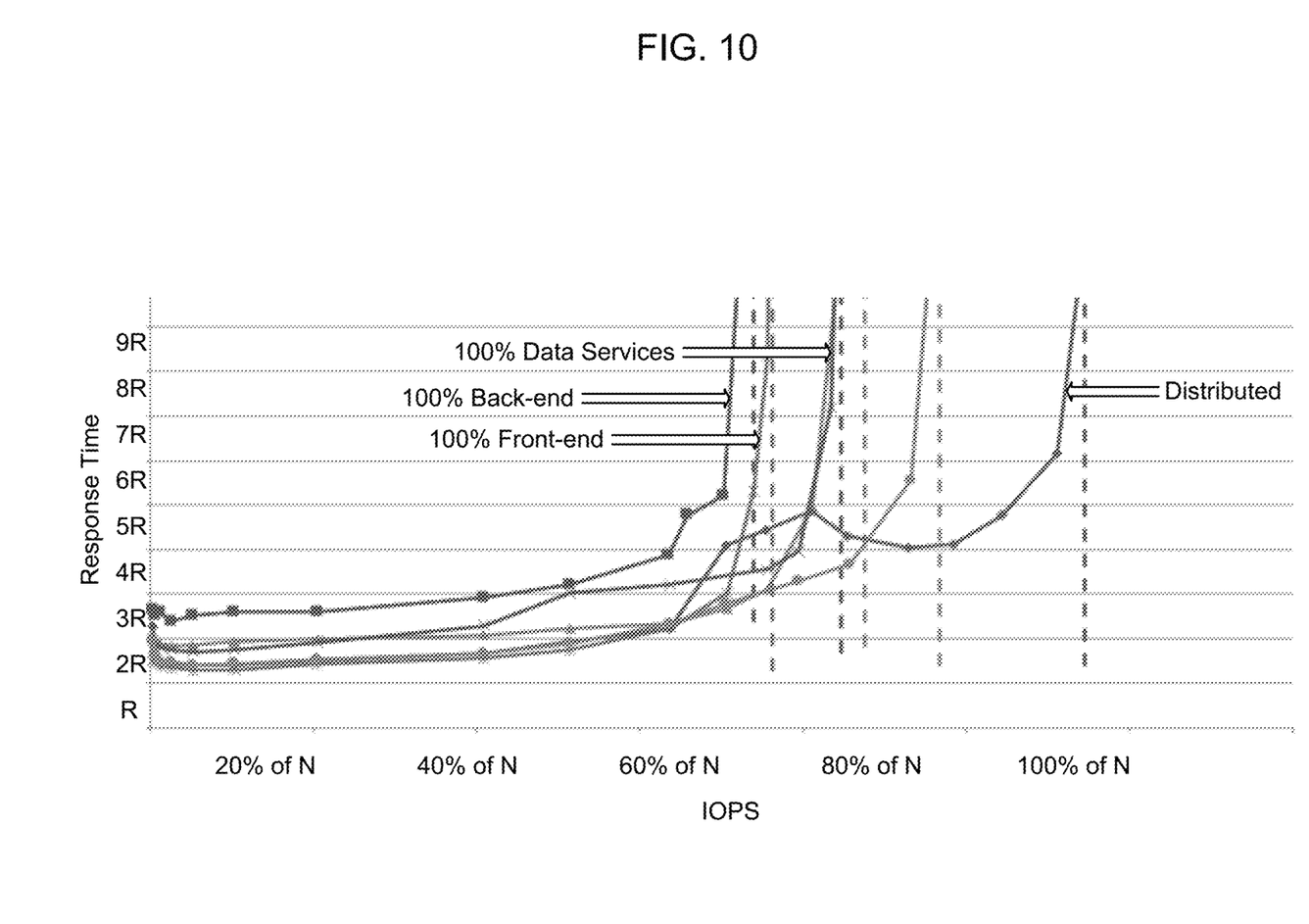
FIG. 10 is a graph of storage engine response time R vs IOPs N comparing the response times of the storage engine when all of the IOPs were processed by individual emulations, as compared to the results achieved by the storage engine using the RRM distribution process to distribute read IO operations between emulations, according to some embodiments.

FIG. 9 is a graph of the storage engine response time R vs % of N IOPs achieved by the RRM distribution process 205, by distributing read IO operations to the front-end emulation 200, back-end emulation 230, and data services emulation 220, using the process shown in FIG. 5, according to some embodiments. FIG. 10 is a graph of storage engine response time R vs % of N IOPs comparing the response times of the storage engine 118 when all of the IOPs were processed by individual emulations, as compared to the results achieved by the storage engine 118 using the RRM distribution process 205 to distribute read IO operations between emulations 200, 220, 230, according to some embodiments. As shown in FIGS. 9 and 10, the RRM distribution process 205 enables the storage engine 118 to achieve closer to 100% of N IOPs, which is significantly greater than what is achievable by any individual emulation alone.

Although FIG. 5 shows the RRM distribution process 205 preferentially selecting the back-end emulation 230 where the read IO operation is not serviced by the front-end emulation 200, in some embodiments the RRM distribution process 205 looks at the data service emulation response time 320, data service read IO thread CPU utilization 325, back-end emulation response time 330, and back-end emulation read IO thread CPU utilization 335, and uses these values to decide if the data services emulation 220 should service the read IO operation or if the back-end emulation 230 should service the read IO operation.

For example, if the data services emulation response time 320 is lower than the back-end emulation response time 330, and the data services emulation read IO thread CPU utilization 325 is lower than the back-end emulation read IO thread CPU utilization 335, then the RRM distribution process 205 selects the data services emulation 220 to service the read IO operation. This enables the CPU cycles of the data services emulation 220 to be used to service the read IO operation and thus reduces the CPU consumption of the front-end emulation 200 and reduces the CPU consumption of the back-end emulation 230. Similarly, if the back-end emulation response time 330 is lower than the data service emulation response time 320, and the back-end emulation read IO thread CPU utilization 335 is below a threshold (the back-end emulation read IO thread has not used all its CPU cycles), the RRM distribution process 205 selects the back-end emulation 230 to service the read IO operation.

In some embodiments, the RRM distribution process 205 continuously samples the response time across all three emulations (front-end emulation 200, data services emulation 220, and back-end emulation 230) to find the optimal path that provides the lowest response time for a given read IO operation. At the same time, the RRM distribution process 205 leverages all CPU cycles across the front-end emulation 200, data services emulation 220, and back-end emulation 230 in the storage engine 118, by continuously sampling the emulation read IO thread utilization rates of each of the three emulations 200, 220, 230. By looking at both response time and read IO thread CPU utilization of each of the emulations 200, 220, 230, the RRM distribution process 205 is able to find the best response time and the maximum IOPs by automatically distributing incoming RRM workload to different emulations with IO threads on the storage engine 118.

Although some embodiments have been described in which the storage engine 118 has three emulations that each are allocated particular amounts of CPU resources and are able to access attached storage resources using a respective read IO thread, it should be understood that the storage engine 118 may have other numbers of similarly configured emulations greater than or equal to two. Accordingly, in some embodiments the storage engine may have two emulations that each are allocated particular amounts of CPU resources and are able to access attached storage resources using a respective read IO thread. In other embodiments the storage engine may have four, five, or another number of emulations that each are allocated particular amounts of CPU resources and are able to access attached storage resources using a respective read IO thread, depending on the implementation.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for distributing read operations between emulations in a storage engine, the computer program including a set of instructions which, when executed by a computer, cause the computer to perform a method comprising the steps of:

determining execution parameters of a first emulation, the first emulation configured to receive read IO operations from a host, the first emulation having a first read IO thread configured to execute on a first subset of the CPU cores to service a first subset of read IO operations by reading data associated with the first subset of read IO operations from external storage resources into the memory, the first emulation being further configured to respond to the read IO operations by transmitting data from the memory to the host;

determining execution parameters of a second emulation having a second read IO thread configured to execute on a second subset of the CPU cores to service a second subset of read IO operations by reading data associated with the second subset of read IO operations from the external storage resources into the memory;

determining execution parameters of a third emulation having a third read IO thread configured to execute on a third subset of the CPU cores to service a third subset of read IO operations by reading data associated with the third subset of read IO operations from the external storage resources into the memory;

monitoring the execution parameters of the first, second, and third emulations by a RRM distribution process, the RRM distribution process being configured to distribute newly received read IO operations between the first, second, and third emulations by:

preferentially assigning newly received read operations to the first emulation to be included in the first subset of read IO operations to be serviced by the first read IO thread of the first emulation, unless the execution parameters of the first emulation meet a first set of criteria;

secondarily assigning newly received read operations, that are not assigned to the first emulation, to the second emulation to be included in the second subset of read IO operations to be serviced by the second read IO thread of the second emulation, unless the execution parameters of the second emulation meet a second set of criteria;

assigning all newly received read operations, that are not assigned to the first emulation or to the second emulation, to the third emulation to be included in the third subset of read IO operations to be serviced by the third read IO thread.

2. The non-transitory tangible computer readable storage medium of claim 1, wherein the execution parameters comprise a response time of the first emulation, a percentage CPU cycle usage of the first read IO thread, a response time of the second emulation, a percentage CPU cycle usage of the second read IO thread, a response time of the third emulation, and a percentage CPU cycle usage of the third read IO thread.

3. The non-transitory tangible computer readable storage medium of claim 2, wherein the first set of criteria comprises the percentage CPU cycle usage of the first read IO thread not being above a first threshold.

4. The non-transitory tangible computer readable storage medium of claim 2, wherein the first set of criteria comprises the response time of the first read IO thread being above a second threshold or the response time of the first read IO thread increasing in a non-linear manner.

5. The non-transitory tangible computer readable storage medium of claim 2, wherein the first set of criteria comprises the percentage CPU cycle usage of the first read IO thread not being above a first threshold; and the response time of the first read IO thread is above a second threshold or the response time of the first read IO thread is increasing in a non-linear manner.

6. The non-transitory tangible computer readable storage medium of claim 2, wherein the second set of criteria comprises the response time of the second read IO thread being above a third threshold or the response time of the second read IO thread increasing in a non-linear manner.

7. The non-transitory tangible computer readable storage medium of claim 2, wherein the second set of criteria comprises the percentage CPU cycle usage of the second read IO thread not being above a fourth threshold.

8. The non-transitory tangible computer readable storage medium of claim 2, wherein the second set of criteria comprises the response time of the second read IO thread being above a third threshold or the response time of the second read IO thread increasing in a non-linear manner, and the percentage CPU cycle usage of the second read IO thread not being above a fourth threshold.

9. A method, comprising:

determining execution parameters of a first emulation, the first emulation configured to receive read IO operations from a host, the first emulation having a first read IO thread configured to execute on a first subset of the CPU cores to service a first subset of read IO operations by reading data associated with the first subset of read IO operations from external storage resources into the memory, the first emulation being further configured to respond to the read IO operations by transmitting data from the memory to the host;

determining execution parameters of a second emulation having a second read IO thread configured to execute on a second subset of the CPU cores to service a second subset of read IO operations by reading data associated with the second subset of read IO operations from the external storage resources into the memory;

determining execution parameters of a third emulation having a third read IO thread configured to execute on a third subset of the CPU cores to service a third subset of read IO operations by reading data associated with the third subset of read IO operations from the external storage resources into the memory;

monitoring the execution parameters of the first, second, and third emulations by a RRM distribution process, the RRM distribution process being configured to distribute newly received read IO operations between the first, second, and third emulations by:

preferentially assigning newly received read operations to the first emulation to be included in the first subset of read IO operations to be serviced by the first read IO thread of the first emulation, unless the execution parameters of the first emulation meet a first set of criteria;

secondarily assigning newly received read operations, that are not assigned to the first emulation, to the second emulation to be included in the second subset of read IO operations to be serviced by the second read IO thread of the second emulation, unless the execution parameters of the second emulation meet a second set of criteria;

assigning all newly received read operations, that are not assigned to the first emulation or to the second emulation, to the third emulation to be included in the third subset of read IO operations to be serviced by the third read IO thread.

10. The method of claim 9, wherein the execution parameters comprise a response time of the first emulation, a percentage CPU cycle usage of the first read IO thread, a response time of the second emulation, a percentage CPU cycle usage of the second read IO thread, a response time of the third emulation, and a percentage CPU cycle usage of the third read IO thread.

11. The method of claim 10, wherein the first set of criteria comprises the percentage CPU cycle usage of the first read IO thread not being above a first threshold.

12. The method of claim 10, wherein the first set of criteria comprises the response time of the first read IO thread being above a second threshold or the response time of the first read IO thread increasing in a non-linear manner.

13. The method of claim 10, wherein the first set of criteria comprises the percentage CPU cycle usage of the first read IO thread not being above a first threshold; and the response time of the first read IO thread is above a second threshold or the response time of the first read IO thread is increasing in a non-linear manner.

14. The method of claim 10, wherein the second set of criteria comprises the response time of the second read IO thread being above a third threshold or the response time of the second read IO thread increasing in a non-linear manner.

15. The method of claim 10, wherein the second set of criteria comprises the percentage CPU cycle usage of the second read IO thread not being above a fourth threshold.

16. The method of claim 10, wherein the second set of criteria comprises the response time of the second read IO thread being above a third threshold or the response time of the second read IO thread increasing in a non-linear manner, and the percentage CPU cycle usage of the second read IO thread not being above a fourth threshold.

17. A storage engine, comprising:
a memory;
a plurality of CPU cores;
a first emulation configured to receive read IO operations from a host, the first emulation having a first read IO thread configured to execute on a first subset of the CPU cores to service a first subset of read IO operations by reading data associated with the first subset of read IO operations from external storage resources into the memory, the first emulation being further configured to respond to the read IO operations by transmitting data from the memory to the host;
a second emulation having a second read IO thread configured to execute on a second subset of the CPU cores to service a second subset of read IO operations by reading data associated with the second subset of read IO operations from the external storage resources into the memory;
a third emulation having a third read IO thread configured to execute on a third subset of the CPU cores to service a third subset of read IO operations by reading data associated with the third subset of read IO operations from the external storage resources into the memory; and
a RRM distribution process instantiated in the first emulation, the RRM distribution process being configured to monitor execution parameters of the first, second, and third emulations;
wherein the RRM distribution process is configured to
preferentially assign newly received read operations to the first emulation to be included in the first subset of read IO operations to be serviced by the first read IO thread of the first emulation, unless the execution parameters of the first emulation meet a first set of criteria;
secondarily assign newly received read operations, that are not assigned to the first emulation, to the second emulation to be included in the second subset of read IO operations to be serviced by the second read IO thread of the second emulation, unless the execution parameters of the second emulation meet a second set of criteria;
assign all newly received read operations, that are not assigned to the first emulation or to the second emulation, to the third emulation to be included in the third subset of read IO operations to be serviced by the third read IO thread.

18. The storage engine of claim 17, wherein the execution parameters comprise a response time of the first emulation, a percentage CPU cycle usage of the first read IO thread, a response time of the second emulation, a percentage CPU cycle usage of the second read IO thread, a response time of the third emulation, and a percentage CPU cycle usage of the third read IO thread.

19. The storage engine of claim 18, wherein the first set of criteria comprises the percentage CPU cycle usage of the first read IO thread not being above a first threshold; and the response time of the first read IO thread is above a second threshold or the response time of the first read IO thread is increasing in a non-linear manner.

20. The storage engine of claim 18, wherein the second set of criteria comprises the response time of the second read IO thread being above a third threshold or the response time of the second read IO thread increasing in a non-linear manner, and the percentage CPU cycle usage of the second read IO thread not being above a fourth threshold.

* * * * *